United States Patent [19]

Chaput et al.

[11] Patent Number: 5,282,709
[45] Date of Patent: Feb. 1, 1994

[54] SEPARATION NUT WITH A RESTRAINING WIRE

[75] Inventors: Dale T. Chaput, Yorba Linda; Michael P. Edwards, Long Beach; Steven D. Swain, Hawthorne, all of Calif.

[73] Assignee: G & H Technology, Inc., Camarillo, Calif.

[21] Appl. No.: 55,877

[22] Filed: May 4, 1993

[51] Int. Cl.⁵ .................... F16B 37/08; F16B 39/36
[52] U.S. Cl. ................................ 411/433; 411/267; 411/270
[58] Field of Search ............... 411/432, 433, 267, 270

[56] References Cited

U.S. PATENT DOCUMENTS

| | | | |
|---|---|---|---|
| 2,489,613 | 11/1949 | Beswick . | |
| 2,576,579 | 11/1951 | Donovan . | |
| 3,160,187 | 12/1964 | Zahodikin . | |
| 3,405,593 | 10/1968 | Kriesel | 411/267 X |
| 4,737,059 | 4/1988 | Batten | 411/437 |
| 4,875,266 | 10/1989 | Batten | 411/267 X |
| 4,930,961 | 6/1990 | Weis . | |
| 4,974,888 | 12/1990 | Childers | 411/433 X |
| 5,108,133 | 4/1992 | Maloberti | 411/433 X |
| 5,160,233 | 11/1992 | McKinnis | 411/433 |

Primary Examiner—Neill R. Wilson
Attorney, Agent, or Firm—Thomas I. Rozsa; Dong Chen

[57] ABSTRACT

The present invention is a separation nut for fastening and releasing a threaded bolt under remote or manual controls. The preferred embodiment of the present invention separation nut includes a housing, a base, a ramp which is fitted into the base, and a three-piece segmented threaded nut placed on top of the ramp and enclosed by a three-piece segmented spool, which is in turn bounded by a restraining wire. The three-piece segmented threaded nut and the three-piece segmented spool are held in place by a spring biased plunger. Anti-rotation pins are employed for preventing rotation of the segmented nut. A release pin is provided for inhibiting the restraining wire from releasing the segmented spool. The release pin is connected to a flexible shaft.

42 Claims, 2 Drawing Sheets

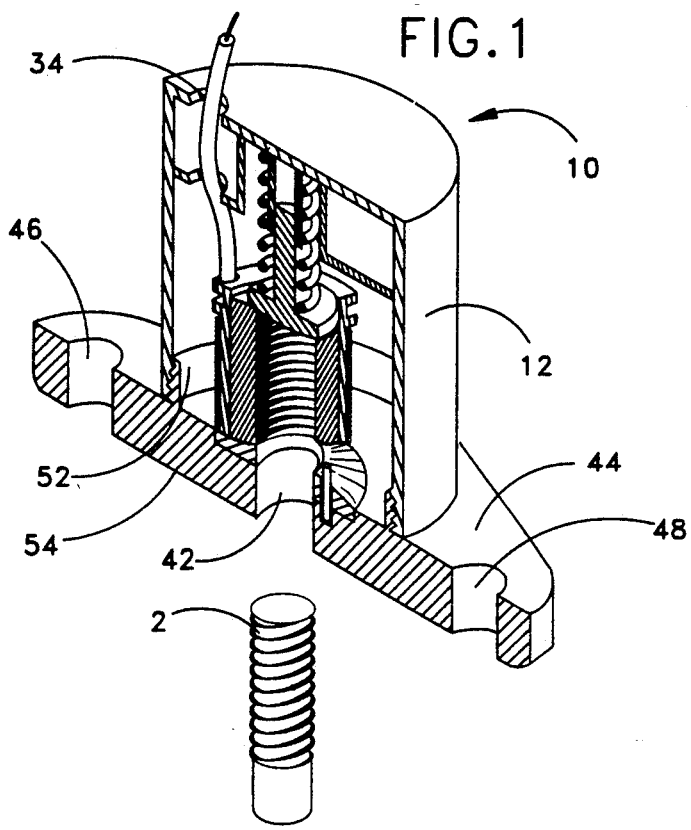
FIG. 1
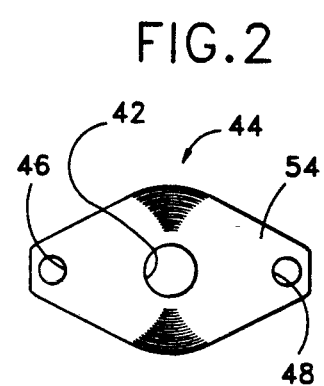
FIG. 2
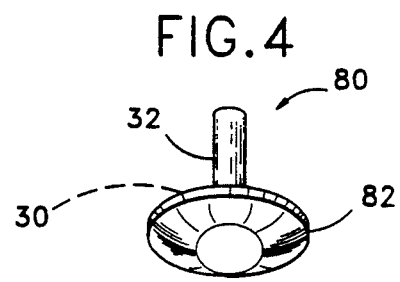
FIG. 4
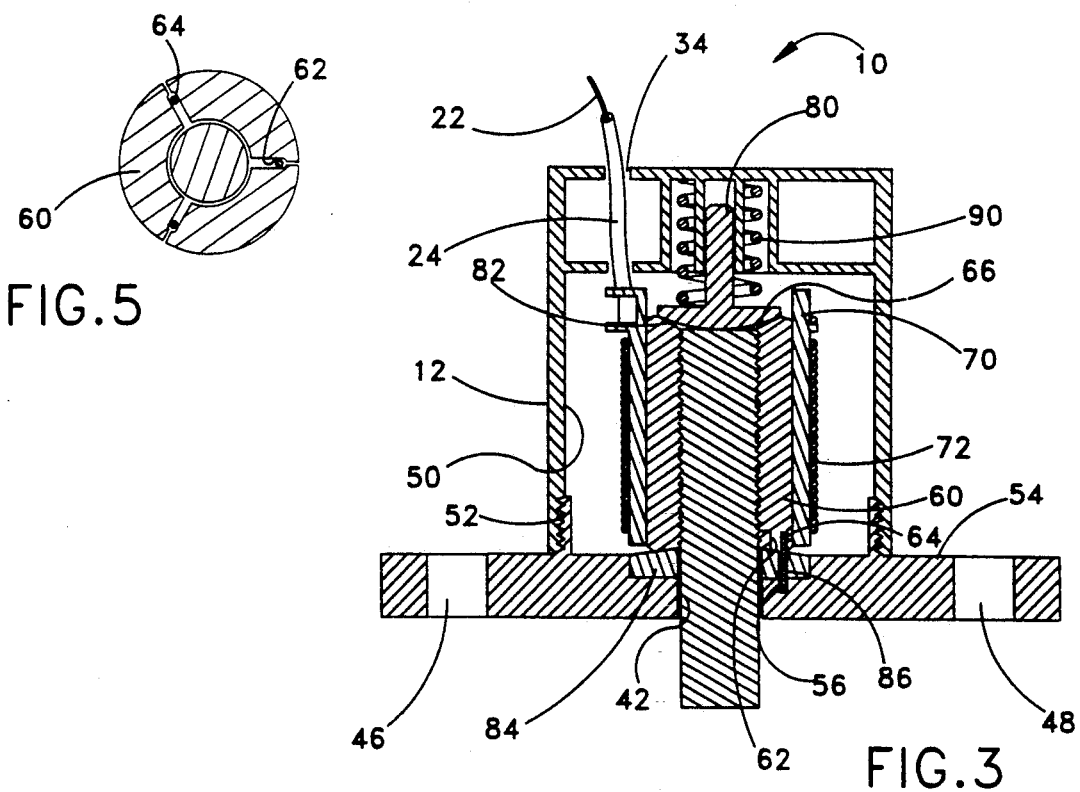
FIG. 5
FIG. 3

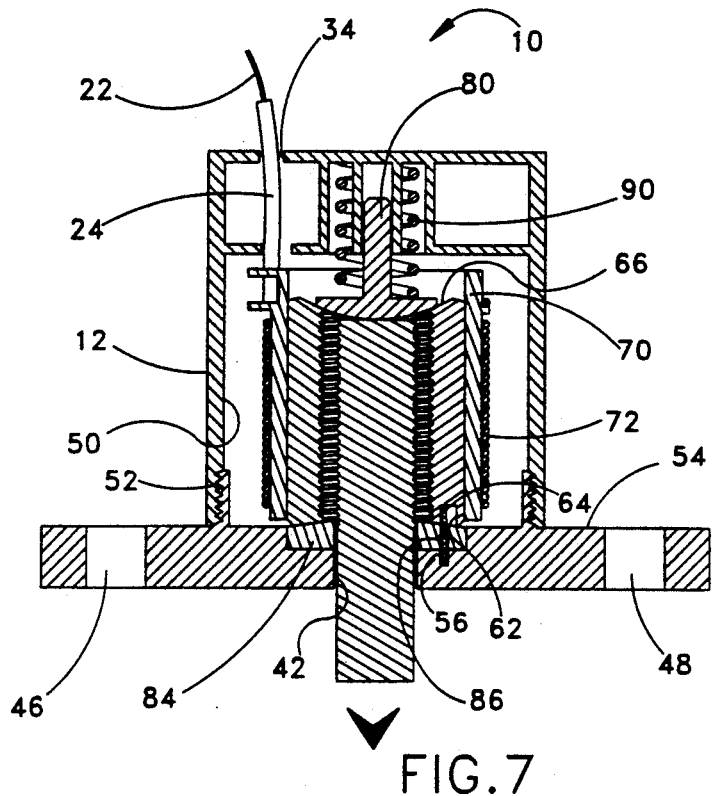
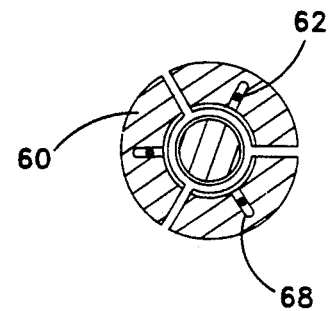
FIG.6
FIG.7
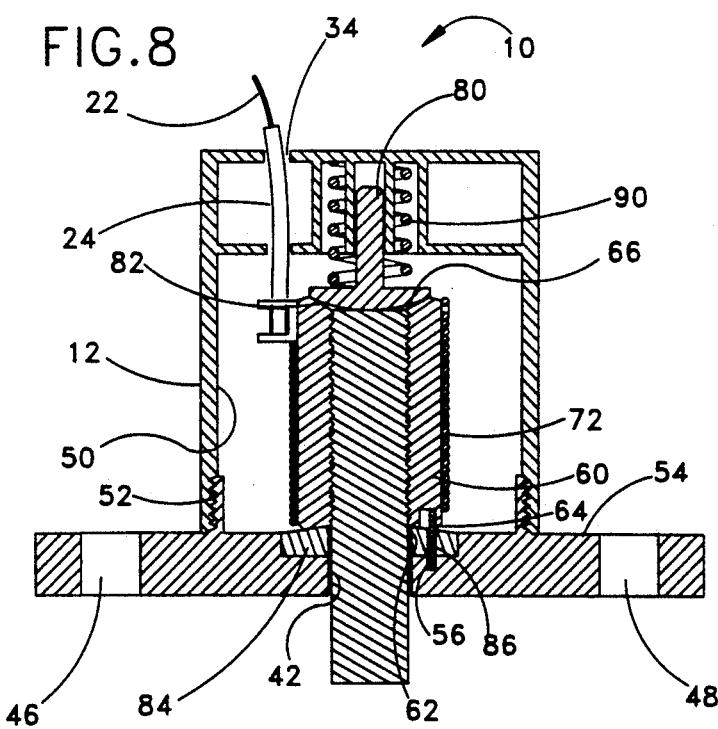
FIG.8
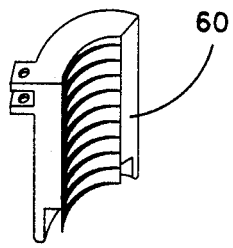
FIG.9

SEPARATION NUT WITH A RESTRAINING WIRE

BACKGROUND OF THE INVENTION

1. Field of the Invention

The present invention relates to the field of structural separation mechanisms. More particularly, the present invention relates to the field of manually or remotely controlled fasteners utilizing a segmented threaded nut for releasibly engaging a threaded bolt.

2. Description of The Prior Art

Separation nuts are widely used in manufacturing and construction industries. The main purpose of utilizing separation nuts is to fasten threaded bolts in a quick releasible manner. Such separation nuts are traditionally known as "quick nuts". The following prior art references are relevant to the field of the present invention:

1. U.S. Pat. No. 2,489,613 issued to Beswick on Nov. 29, 1949 for "Quick Action Nut" (hereafter "the Beswick Patent").

2. U.S. Pat. No. 2,576,579 issued to Donovan on Nov. 27, 1951 for "Cone Grip Lock Nut" (hereafter "the Donovan Patent").

3. U.S. Pat. No. 3,160,187 issued to Zahodiakin on Dec. 8, 1964 for "Quick Locking Fastener With Single Movable Jaw" (hereafter "the Zahodiakin Patent").

4. U.S. Pat. No. 4,875,266 issued to Batten on Oct. 24, 1989 for "Releasable High Torque Fastener" (hereafter "the Batten Patent").

5. U.S. Pat. No. 4,930,961 issued to Weis on Jun. 5, 1990 for "Quick Lock And Release Fastener" (hereafter "the Weis Patent").

The Batten Patent discloses an easily releasable fastener specially designed for high torque applications. The Batten Patent fastener comprises a washer, a nut and a retaining ring. The nut has three threaded segments all retained by the retaining ring. A threaded bolt can be threaded into the three-segmented nut, and the retaining ring acts to keep the fastener as a unit. The Batten Patent also comprises a retractor for removing the retaining ring to release the bolt. The Batten Patent has disclosed the feature of utilizing a three-segmented nut. However, the retaining ring of the Batten Patent is a unitary piece which can only be manually removed with the retractor.

The Weis Patent discloses a quick lock and release fastener. The Weis Patent fastener comprises a split threaded nut operable within a drive plate and an operating head fixed with the drive plate. The split nut and the drive plate have cam engagement for constriction into threaded engagement and alternate separation with a bolt. A semi-circular compression spring is provided for facilitating the separation of the two segments of the split nut. The Weis Patent also has not disclosed any segmented retaining means which can be automatically fastened or released through the function of a retaining wire.

The Beswick Patent discloses a quick action nut having a three-segment internal nut contained in an outer member or housing. Each segment of the split nut is independently engaged with a spring biased pin. The segments of the split nut further have outer ribs which are engageable with the inner grooves of the housing. Again, the Beswick Patent has not disclosed the feature of utilizing segmented retaining means for facilitating automatic fastening or releasing of an installed threaded bolt.

The Donovan Patent discloses a quick grip lock nut utilizing a three-segmented nut adapted to secure the skin of airplane wings.

The Zahodiakin Patent discloses a quick locking nut with a self-contained coil spring for biasing a movable clamping jaw.

It can be seen that many prior art quick nuts have utilized a segmented threaded nut. Typically, the segmented threaded nut includes three threaded segments. To retain a threaded element such as a threaded bolt, the threaded segments are tightened together by various means, including a circular sleeve, a cam disc, a biasing spring, etc. To release the threaded bolt, the threaded segments are loosened. Traditional separation nuts are often released by manual and local operations.

However, in many situations such as in aerospace applications, it is often required that the releasing of the separation nuts be manually and remotely controlled. One type of separation nut used in the aerospace industry utilizes explosive initiators such as squibs for a remotely controlled release, and are known as "explosive separation nuts". However, in many aerospace apparatus such as satellites, it is highly desirable to employ separation nuts which utilize a quick and easy fastening and releasing of the releasing mechanism because the separation nuts are located very close to highly sensitive electronic modules.

Another requirement in aerospace applications is that the initiation or release of the retaining wire must create no shock to the system. The prior art explosive device often creates a pyrotechnic shock wave to the system, and therefore is highly undesirable.

In addition to the requirement that the separation be performed in a wire-wrapped segmented spool, the separation nuts used in aerospace applications must also satisfy other critical requirements. For example, the separation nuts often need to be very small (such as less than one inch long) and very lightweight (such as a few ounces), but must be able to tolerate a very high tensile load (such as up to ten thousand pounds). Therefore, it is highly desirable to have a very efficient and also very effective design and construction of a new separation nut which can be used in various applications, particularly in the aerospace industry.

SUMMARY OF THE INVENTION

The present invention is a separation nut for releasibly engaging a threaded bolt which can be manually or remotely controlled to very quickly release the threaded bolt. The primary object of the present invention is to provide a structural support for a bolted joint that can be manually or remotely separated by releasing a release pin or sending an electrical signal without the use of explosive initiators.

It is known that segmented threaded nuts have been utilized in prior art quick nuts. The prior art segmented threaded nuts often include three or more threaded segments. The threaded segments are held together by various means, including a circular sleeve, a cam disc, a biasing spring, etc., for retaining a threaded bolt. The prior art separation nuts are often released by manual and local operations.

The present invention is a novel and unique manually or remotely controlled separation nut particularly designed for aerospace applications. It has been discovered, according to the present invention, that in many situations such as in aerospace applications, it is highly desirable to employ separation nuts which utilize a non-explosive releasing mechanism because the separation nuts are located very close to highly sensitive electronic equipment.

It has also been discovered, according to the present invention, that in many situations such as in aerospace applications, it is highly desirable to employ separation nuts that are compact in size, light in weight and adequate in capacity.

It has been further discovered, according to the present invention, that in many situations such as in aerospace applications, it is highly desirable to eliminate any creation of shock wave to the system when the restraining wire is initiated or released.

It has additionally been discovered, according to the present invention, that in many situations such as in aerospace applications, it is highly desirable to employ separation nuts that are capable of incorporating a restraining wire for retaining the segmented spool, which in turn will hold the segmented nut together for coupling the installed threaded element so that it can be quickly released by acting on the release pin.

It is therefore a primary object of the present invention to provide a separation nut which utilizes only non-explosive releasing mechanisms that can be manually or remotely controlled, so that the separation nut is suitable to be used in many situations such as in aerospace applications.

It is also an object of the present invention to provide a separation nut which has very efficient and very effective design and construction, so that the separation nut is suitable to be used in many situations such as in aerospace applications.

It is a further object of the present invention to provide a separation nut which create no pyrotechnic shock wave to the system when the restraining wire is initiated or released, so that the separation nut is suitable to be used in many situations such as in aerospace applications.

It is an additional object of the present invention to provide a restraining wire, so that the restraining wire is allowed to uncoil to thereby release the segmented spool which in turn will release the segmented nut which in turn releases the threaded element, so that the separation nut is suitable to be used in many situations such as in aerospace applications.

The present invention is a separation nut attachable to an external structure for fastening and releasing a threaded bolt through manual or remote control. The preferred embodiment of the present invention separation nut includes a housing, a removably attachable bottom, a ramp which is fitted into the removably attachable bottom, and a three-piece segmented threaded nut placed on top of the ramp and enclosed by a three-piece segmented spool, which is bounded by a restraining wire. The housing has a top end, a bottom end and a tubular sidewall with a threaded section adjacent to the bottom end, where the removably attachable bottom has a central opening which extends into a hollow chamber of the housing. The three-piece segmented threaded nut and the three-piece segmented spool are held in place by a spring biased plunger. Anti-rotation pins are utilized for preventing the segmented nut from rotating. A release pin is provided for inhibiting the restraining wire from releasing the segmented spool. The release pin is connected to a flexible shaft. All of the above described components are contained in the cylindrical shaped housing which is screwed onto the removably attachable bottom which forms the base of the housing, where the compression spring is compressed by the housing.

The present invention mechanism is ready for accepting the installation of a threaded bolt which can be threaded into the segmented nut. The restraining wire will hold the segmented spool together, which in turn will hold the segmented nut together for coupling the installed threaded bolt and it can be quickly released by acting upon the flexible shaft (which may be electrically actuated) to cause the displacement of the release pin, so that the restraining wire is allowed to uncoil to thereby release the segmented spool. Because of the pressure from the plunger, the segmented nut will be separated once the segmented spool is released. The separation of the segmented nut will immediately uncouple and release the installed threaded bolt.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is an exposed perspective view of the present invention separation nut and a threaded bolt.

FIG. 2 is a bottom plan view of the present invention separation nut.

FIG. 3 is a cross-sectional view of the present invention separation nut with a restraining wire for releasibly engaging a threaded bolt in its fastened condition.

FIG. 4 is a perspective view of the plunger.

FIG. 5 is a cross-sectional view of the segmented nut positioned with anti-rotation pins.

FIG. 6 is a cross-sectional view of an alternative embodiment of the segmented nut positioned with anti-rotation pins.

FIG. 7 is a cross-sectional view of the present invention separation nut with a restraining wire for releasibly engaging a threaded bolt in its released condition.

FIG. 8 is a cross-sectional view of another alternative embodiment of the present invention separation nut where the segmented spool is eliminated and the restraining wire is directly wrapped around the segmented nut.

FIG. 9 is a perspective view of one of the segments of the segmented nut in the alternative embodiment of the present invention separation nut where the segmented spool is eliminated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described briefly, the present invention is a non-explosive separation nut with a restraining wire. A preferred embodiment of the present invention separation nut includes a cylindrical shaped housing which is screwed onto a removably attachable bottom to form the base of the housing, a ramp which is fitted into the removably attachable bottom, and a three-piece segmented threaded nut placed on the ramp surface of the ramp and enclosed by a three-piece segmented spool, which is bounded by a restraining wire. The three-piece segmented threaded nut and the three-piece segmented spool are held in place by a spring biased plunger. A release pin is provided for inhibiting the restraining wire from releasing the segmented spool. The release pin is connected to a flexible shaft. The restraining wire will retain the segmented spool together, which in turn will retain the segmented nut together for coupling the installed threaded bolt and it can be quickly released by acting upon the flexible shaft to cause the displacement of the release pin, so that the restraining wire is allowed to uncoil to thereby release the segmented spool. The separation of the segmented nut will immediately uncouple and release the installed threaded bolt.

Referring to FIGS. 1, 2 and 3, there is shown at 10 a preferred embodiment of the present invention separation nut with a restraining wire for fastening and releasing a threaded bolt 2. The separation nut 10 with a restraining wire 72 has a generally cylindrical shaped housing 12. At the top of the housing 12 there is a flexible shaft 22 (which may be electrically actuated) to cause the displacement of a release pin 24. The release pin 24 can be manually or remotely controlled by the flexible shaft 22. The flexible shaft 22 is extended through the opening 34 of the top end of the housing 12.

At the bottom of the removably attachable bottom 44 there is a central hole 42 extending into the housing 12 for receiving the threaded bolt 2. The removably attachable bottom 44 also has a widened base flange 54 which has two holes 46 and 48 for mounting the housing 12 to an external structure. These may be two symmetrically located screw holes to accommodate two mounting screws respectively for mounting the housing of the separation nut to an external structure. The housing 12 is threaded into the threaded mating surface 52 of the removably attachable bottom 44.

Referring particularly to FIG. 3, there is shown a cross-sectional view of the present invention separation nut 10 in its fastened condition. The housing 12 of the separation nut 10 has an internal hollow chamber 50. The threaded bolt 2 extends into the hollow chamber 50 through the bottom hole 42 of the removably attachable bottom 44, and engages with the segmented threaded nut 60 which has the same thread size and is split radially into two or more segments. For example, in the preferred embodiment the segmented threaded nut 60 is split radially into three segments. The exterior surface of the threaded nut 60 is generally cylindrical shaped.

The segments of the segmented threaded nut 60 engage with a hollow cylindrical shaped segmented spool 70 which has a generally cylindrical shaped exterior surface and a cylindrical shaped interior surface to match the exterior surface of the threaded nut. The interior surface of the segmented spool 70 engages with the exterior surface of the segmented threaded nut 60 and is split radially into two or more segments.

For example, in the preferred embodiment the segmented spool 70 is split radially into three segments. The exterior surface of the segmented spool 70 is bound by a restraining wire 72 made of a spring material. When the separation nut 10 is in the fastened condition for retaining the threaded bolt 2, the restraining wire 72 is coiled and tensioned, and rests on the exterior surface of the segmented spool 70, thereby confining the segments of the segmented spool 70 to the segments of the segmented threaded nut 60 together to fasten the threaded bolt 2.

Referring to FIG. 4, there is shown the configuration of the plunger 80. The plunger 80 is constructed like a disc with a flat top surface 30 and a truncated conical shaped bottom side 82. The plunger 80 also includes a shaft 32 which is attached to the center of the disc. The compression spring 90 is placed over the plunger 80 and engages with the inside top end of the housing 12. The compression spring 90 is compressed by the housing 12 which is for facilitating the separation of the segments of the segmented threaded nut 60 in the released condition of the separation nut 10.

The plunger 80 has a ramp surface 82 which is engaged with the top ramp surfaces 66 of the segments of the segmented threaded nut 60. The sliding of the top ramp surfaces 66 of the segments of the segmented threaded nut 60 over the ramp surface 82 of the plunger 80 will ensure the separation of the segments of the segmented threaded nut 60.

Furthermore, a ramp 84 is provided and fitted at the bottom hole 42 of the removably attachable bottom 44 for assisting the separation of the segments of the segmented threaded nut 60 in the released condition of the separation nut 10. The assembled segmented threaded nut 60, the segmented spool 70, the restraining wire 72, the flexible shaft 22 and the release pin 24 are placed on the top surface of the ramp 84. The sliding of the bottom ends of the segments of the segmented threaded nut 60 over the ramp 84 will ensure the separation of the segments of the segmented threaded nut 60.

To prevent the rotation of the segmented nut 60, the present invention employs anti-rotation pins 62, each inserted in a hole 86 through the ramp 84 and a stop dent hole 56 on the removably attachable bottom 44.

Referring to FIG. 5, there is shown a cross-sectional view of the segmented nut 60 positioned with anti-rotation pins 62. The anti-rotation pins 62 are located between the segments of the segmented nut 60 and within the bottom dent or recess 64 thereof, and therefore slidably engaged with the segments of the segmented nut 60. It is noted that although three (3) anti-rotation pins 62 are shown in FIG. 5, the number of the anti-rotation pins 62 are variable. For example, there may be only one (1) anti-rotation pin 62 because as long as the rotation of one of the segments of the segmented nut 60 is obstructed, the other segments are prevented from rotating as well. The anti-rotation pins 62 ensure that when the threaded bolt 2 is threadedly tightened, the segmented nut 60 will not rotate together with the threaded bolt 2. The advantage of using the anti-rotation pins is that the segmented nut 60 and the segmented spool 70 can all be made in a generally cylindrical shape, without the necessity of having any polygonal complementary mating surfaces.

Referring to FIG. 6, there is shown an alternative embodiment of the segmented nut positioned with anti-rotation pins 62. Instead of being positioned between the segments of the segmented nut 60, each anti-rotation pin 62 is now inserted into a bottom dent 68 at the center of each segment of the segmented nut 60, and therefore slidably engaged therein. Again, the number of anti-rotation pins 62 may vary.

Referring to FIG. 7, there is shown a cross-sectional view of the present invention separation nut 10 in its released condition. To separate the threaded bolt 2 from the separation nut 10, the plunger 80 has to move downward on the top ramp surfaces 66 of the segments of the segmented threaded nut 60. This will allow the segments of the segmented threaded nut 60 to move radially away from the threaded bolt 2 and to thereby disengage the threads.

The preload on the threaded bolt 2 also provides a partial force to separate the segments of the segmented threaded nut 60. The energy for providing the relative motion between the plunger 80 and the segmented threaded nut 60 is stored in the compression spring 90. It is arranged such that the compression spring 90 is under compression when the separation nut 10 is in the fastened condition.

The segmented threaded nut 60 is held between the plunger 80 and the ramp 84 by the force of the compression spring 90. The resultant force of the segmented threaded nut 60 is a positive outward force which is transmitted to the segmented spool 70. This causes the restraining wire 72 to be in tension to oppose the separation. The displacement of the release pin 24 allows the restraining wire 72 to uncoil and expand thereby releasing the segmented spool 70 allowing for uncoupling of the threaded bolt 2.

Referring to FIG. 8, there is shown a cross-sectional view of another alternative embodiment of the present invention separation nut where the segmented spool 70 is eliminated and the restraining wire 72 is directly wrapped around the segmented nut 60. However, when the segmented spool 70 is eliminated, one of the segments of the segmented nut 60 may be modified so that it can accommodate the release pin 24, as shown in FIG. 9.

The present invention separation nut with a restraining wire has many advantageous features, including: (a) it can be remotely controlled by electrical, optical or other signals; (b) it has a structure which is capable of tolerating very high tensile loads; (c) it creates no shock wave to the system when the separation is initiated and the attached bolt is released; and (d) it has a very compact design and is very lightweight.

Defined in detail, the present invention is a separation nut with a restraining wire attachable to an external structure for fastening and releasing a threaded bolt, the separation nut comprising: (a) a cylindrical shaped housing having a top end, a bottom end and an interior tubular sidewall with a threaded section adjacent to the bottom end, the bottom end having an opening extending into a hollow chamber; (b) a removably attachable bottom having an exterior threaded mating surface which mates with said threaded section of said interior tubular sidewall and forms a base for said housing; (c) said removably attachable bottom having a central opening extending into said hollow chamber of said housing; (d) a ramp fitted on said removably attachable bottom around said central opening of said bottom and having a ramp surface facing into said hollow chamber; (e) a segmented threaded nut placed on said ramp surface of said ramp and located inside said chamber adjacent to said removably attachable bottom, the segmented threaded nut having a threaded bore aligned with said central opening of said removably attachable bottom for receiving said threaded bolt, the segmented threaded nut also having a cylindrical exterior surface, the segmented threaded nut split radially into a multiplicity of segments; (f) a multiplicity of anti-rotation pins each attached to said ramp and slidably engaged with a bottom dent on said segmented threaded nut for preventing said segmented threaded nut from rotating; (g) a hollow cylindrical shaped segmented spool placed over said segmented threaded nut and having an exterior surface and a cylindrical interior surface which is engaged with said cylindrical exterior surface of said segmented threaded nut, the segmented spool split radially into a multiplicity of segments; (h) a restraining wire wrapped around said exterior surface of said segmented spool for retaining said segmented threaded nut together with said threaded bolt; (i) a spring biased plunger placed above said segmented threaded nut and having a flat top side and a truncated conical shape bottom side with a ramp surface engaged with said segmented threaded nut for retaining and applying pressure to said segmented threaded nut; (j) a compression spring placed over said plunger for compressing said segmented threaded nut between said plunger and said ramp; (k) a flexible shaft extending through said top end of said housing for connecting to an actuator; and (l) a release pin connected to said flexible shaft for inhibiting said restraining wire from releasing said segmented spool, when the release pin is in place said restraining wire compresses said segmented spool which in turn compresses said segmented threaded nut radially inwardly for fastening said threaded bolt, which sets said separation nut in a fastened condition, and when the release pin is displaced said restraining wire is uncoiled thereby releasing said segmented spool which in turn releases said segmented threaded nut radially outwardly for releasing said threaded bolt, which sets said separation nut in a released condition; (m) whereby when said release pin is displaced, said separation nut will shift to said released condition, and when said release pin is in place, said separation nut will maintain said fastened condition.

Defined broadly, the present invention is a separation nut with a separation nut with a restraining wire for fastening and releasing a threaded bolt, the separation nut comprising: (a) a housing having a top end, a bottom end and a sidewall with a threaded section adjacent to the bottom end, the bottom end having an opening extending into a hollow chamber; (b) an attachable bottom having a threaded mating surface which mates with said threaded section of said sidewall and forms a base for said housing, the attachable bottom having an opening extending into said hollow chamber of said housing; (c) a ramp fitted on said attachable bottom around said opening of said bottom and having a ramp surface facing into said hollow chamber; (d) a segmented nut placed on said ramp surface of said ramp and located inside said chamber adjacent to said attachable bottom, the segmented nut having a threaded bore aligned with said opening of said attachable bottom for receiving said threaded bolt, the segmented nut also having an exterior surface, the segmented nut split radially into at least three segments; (e) at least one anti-rotation pin attached to said ramp and slidably engaged with said segmented nut for preventing said segmented nut from rotating; (f) a segmented spool placed over said segmented nut and having an exterior surface and an interior surface complementary to said exterior surface of said segmented nut, the segmented nut split radially into at least three segments; (g) a restraining wire wrapped around said exterior surface of said segmented spool for retaining said segmented nut together with said threaded bolt; (h) a plunger placed above said segmented nut and having a bottom side with a ramp surface engaged with said segmented nut for retaining and applying pressure to said segmented nut; (i) a spring means placed over said plunger for compressing said segmented nut between said plunger and said ramp; and (j) a release pin for inhibiting said restraining wire from releasing said segmented spool, when the release pin is in place said restraining wire compresses said segmented spool which in turn compresses said segmented nut radially inwardly for fastening said threaded bolt, which sets said separation nut in a fastened condition, and when the release pin is displaced said restraining wire is uncoiled thereby releasing said segmented spool which in turn releases said segmented nut radially outwardly for releasing said threaded bolt, which sets said separation nut in a released condition; (k) whereby when said release pin is displaced, said separation nut will shift to said released condition, and when said release pin is in place, said separation nut will maintain said fastened condition.

Defined more broadly, the present invention is a separation nut for fastening and releasing a threaded element, the separation nut comprising: (a) a housing having a top end and a bottom end with an opening extending into a hollow chamber; (b) a segmented nut located inside said chamber, the segmented nut having a threaded bore aligned with said bottom opening for receiving said threaded element, the segmented nut also having an exterior surface, the segmented nut split radially into at least two segments; (c) means for preventing said segmented nut from rotating; (d) a segmented spool placed over said segmented nut and having an exterior surface and an interior surface complementary to said exterior surface of said segmented nut, the segmented spool split radially into at least two segments; (e) a restraining wire wrapped around said exterior surface of said segmented spool for retaining said segmented nut together with said threaded element; (f) a plunger placed above said segmented nut for retaining and applying pressure to said segmented nut; and (g) means for inhibiting said restraining wire from releasing said segmented spool; (h) whereby when said means is in place said restraining wire compresses said segmented spool which in turn compresses said segmented nut radially inwardly for fastening said threaded element, and when said means is displaced said restraining wire is uncoiled thereby releasing said segmented spool which in turn releases said segmented nut radially outwardly for releasing said threaded element.

Defined alternatively, the present invention is a separation nut with a restraining wire for fastening and releasing a threaded bolt, the separation nut comprising: (a) a housing having a top end, a bottom end and a sidewall with a threaded section adjacent to the bottom end, the bottom end having an opening extending into a hollow chamber; (b) an attachable bottom having a threaded mating surface which mates with said threaded section of said sidewall and forms a base for said housing, the attachable bottom having an opening extending into said hollow chamber of said housing; (c) a ramp fitted on said attachable bottom around said opening of said bottom and having a ramp surface facing into said hollow chamber; (d) a segmented nut placed on said ramp surface of said ramp and located inside said chamber adjacent to said attachable bottom, the segmented nut having a threaded bore aligned with said opening of said attachable bottom for receiving said threaded bolt, the segmented nut also having an exterior surface, the segmented nut split radially into at least three segments; (e) at least one anti-rotation pin attached to said ramp and slidably engaged with said segmented nut for preventing said segmented nut from rotating; (f) a restraining wire wrapped around said exterior surface of said segmented nut for retaining said segmented nut together with said threaded bolt; (g) a plunger placed above said segmented nut and having a bottom side with a ramp surface engaged with said segmented nut for retaining and applying pressure to said segmented nut; (h) a spring means placed over said plunger for compressing said segmented nut between said plunger and said ramp; and (i) a release pin for inhibiting said restraining wire from releasing said segmented nut, when the release pin is in place said restraining wire compresses said segmented nut radially inwardly for fastening said threaded bolt, which sets said separation nut in a fastened condition, and when the release pin is displaced said restraining wire is uncoiled thereby releasing said segmented nut radially outwardly for releasing said threaded bolt, which sets said separation nut in a released condition; (j) whereby when said release pin is displaced, said separation nut will shift to said released condition, and when said release pin is in place, said separation nut will maintain said fastened condition.

Defined even more broadly, the present invention is a separation nut for fastening and releasing a structural element, comprising: (a) a housing having an opening extending into a hollow chamber; (b) a segmented nut located inside said chamber, the segmented nut having a bore aligned with said opening for receiving said structural element, the segmented nut also having an exterior surface, the segmented nut split radially into at least two segments; (c) means for preventing said segmented nut from rotating; (d) a restraining wire wrapped around said exterior surface of said segmented nut for retaining said segmented nut together with said structural element; (e) a plunger placed above said segmented nut for retaining and applying pressure to said segmented nut; and (f) means for inhibiting said restraining wire from releasing said segmented nut; (g) whereby when said restraining means is displaced said restraining wire is uncoiled thereby releasing said segmented nut radially outwardly for releasing said structural element, and when said means is in place said restraining wire compresses said segmented nut radially inwardly for fastening said structural element.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A separation nut with a restraining wire attachable to an external structure for fastening and releasing a threaded bolt, the separation nut comprising:

a. a cylindrical shaped housing having a top end, a bottom end and an interior tubular sidewall with a threaded section adjacent to the bottom end, the bottom end having an opening extending into a hollow chamber;

b. a removably attachable bottom having an exterior threaded mating surface which mates with said threaded section of said interior tubular sidewall and forms a base for said housing;

c. said removably attachable bottom having a central opening extending into said hollow chamber of said housing;

d. a ramp fitted on said removably attachable bottom around said central opening of said bottom and having a ramp surface facing into said hollow chamber;

e. a segmented threaded nut placed on said ramp surface of said ramp and located inside said chamber adjacent to said removably attachable bottom, the segmented threaded nut having a threaded bore aligned with said central opening of said removably attachable bottom for receiving said threaded bolt, the segmented threaded nut also having a cylindrical exterior surface, the segmented threaded nut split radially into a multiplicity of segments;

f. A multiplicity of anti-rotation pins each attached to said ramp and slidably engaged with a bottom dent on said segmented threaded nut for preventing said segmented threaded nut from rotating;

g. a hollow cylindrical shaped segmented spool placed over said segmented threaded nut and having an exterior surface and a cylindrical interior surface which is engaged with said cylindrical exterior surface of said segmented threaded nut, the segmented spool split radially into a multiplicity of segments;

h. a restraining wire made of a spring material, coiled and tensioned and wrapped around said exterior surface of said segmented spool for retaining said segmented threaded nut together with said threaded bolt;

i. a spring biased plunger placed above said segmented threaded nut and having a flat top side and a truncated conical shape bottom side with a ramp surface engaged with said segmented threaded nut for retaining and applying pressure to said segmented threaded nut;

j. a compression spring placed over said plunger for compressing said segmented threaded nut between said plunger and said ramp;

k. a flexible shaft extending through said top end of said housing for connecting to an actuator; and l. a release pin connected to said flexible shaft for inhibiting said restraining wire from releasing said segmented spool, when the release pin is in place said restraining wire is coiled and tensioned and compresses said segmented spool which in turn compresses said segmented threaded nut radially inwardly for fastening said threaded bolt, which sets said separation nut in a fastened condition, and when the release pin is displaced said restraining wire is uncoiled and expands thereby releasing said segmented spool which in turn releases said segmented threaded nut radially outwardly for releasing said threaded bolt, which sets said separation nut in a released condition;

m. whereby when said release pin is displaced, said separation nut will shift to said released condition, and when said release pin is in place, said separation nut will maintain said fastened condition.

2. The invention as defined in claim 1 wherein said removably attachable bottom has a widened flange with means for mounting said housing to said external structure.

3. The invention as defined in claim 2 wherein said means for mounting said housing to said external structure includes two symmetrically located screw holes to accommodate two mounting screws respectively for mounting said housing to said external structure.

4. The invention as defined in claim 1 wherein said segmented threaded nut splits radially into three segments.

5. The invention as defined in claim 1 wherein said segmented spool splits radially into three segments.

6. The invention as defined in claim 1 wherein said anti-rotation pins are inserted through a hole on said ramp and a stop dent hole on said removably attached bottom.

7. A separation nut with a restraining wire for fastening and releasing a threaded bolt, the separation nut comprising:

a. a housing having a top end, a bottom end and a sidewall with a threaded section adjacent to the bottom end, the bottom end having an opening extending into a hollow chamber;

b. an attachable bottom having a threaded mating surface which mates with said threaded section of said sidewall and forms a base for said housing, the attachable bottom having an opening extending into said hollow chamber of said housing;

c. a ramp fitted on said attachable bottom around said opening of said bottom and having a ramp surface facing into said hollow chamber;

d. a segmented nut placed on said ramp surface of said ramp and located inside said chamber adjacent to said attachable bottom, the segmented nut having a threaded bore aligned with said opening of said attachable bottom for receiving said threaded bolt, the segmented nut also having an exterior surface, the segmented nut split radially into at least three segments;

e. at least one anti-rotation pin attached to said ramp and slidably engaged with said segmented nut for preventing said segmented nut from rotating;

f. a segmented spool placed over said segmented nut and having an exterior surface and an interior surface complementary to said exterior surface of said segmented nut, the segmented nut split radially into at least three segments;

g. a restraining wire made of a spring material, coiled and tensioned and wrapped around said exterior surface of said segmented spool for retaining said segmented nut together with said threaded bolt;

h. a plunger placed above said segmented nut and having a bottom side with a ramp surface engaged with said segmented nut for retaining and applying pressure to said segmented nut;

i. a spring means placed over said plunger for compressing said segmented nut between said plunger and said ramp; and j. a release pin for inhibiting said restraining wire from releasing said segmented spool, when the release pin is in place said restraining wire is coiled and tensioned and compresses said segmented spool which in turn compresses said segmented nut radially inwardly for fastening said threaded bolt, which sets said separation nut in a fastened condition, and when the release pin is displaced said restraining wire is uncoiled and expands thereby releasing said segmented spool which in turn releases said segmented nut radially outwardly for releasing said threaded bolt, which sets said separation nut in a released condition;

k. whereby when said release pin is displaced, said separation nut will shift to said released condition, and when said release pin is in place, said separation nut will maintain said fastened condition.

8. The invention as defined in claim 7 wherein said attachable bottom has a widened flange with means for mounting said housing to an external structure.

9. The invention as defined in claim 8 wherein said means for mounting said housing to said external structure includes at least one screw hole to accommodate at least one mounting screw for mounting said housing to said external structure.

10. The invention as defined in claim 7 wherein said at least one anti-rotation pin is inserted through a hole on said ramp and a stop dent hole on said attachable bottom.

11. The invention as defined in claim 7 wherein said plunger is a spring biased.

12. The invention as defined in claim 7 wherein said spring means is a compression spring.

13. The invention as defined in claim 7 further comprising a flexible shaft extending through said top end of said housing for connection to an actuator.

14. The invention as defined in claim 13 wherein said release pin is connected to said flexible shaft.

15. A separation nut for fastening and releasing a threaded element, the separation nut comprising:
 a. a housing having a top end and a bottom end with an opening extending into a hollow chamber;
 b. a segmented nut located inside said chamber, the segmented nut having a threaded bore aligned with said bottom opening for receiving said threaded element, the segmented nut also having an exterior surface, the segmented nut split radially into at least two segments;
 c. means for preventing said segmented nut from rotating;
 d. a segmented spool placed over said segmented nut and having an exterior surface and an interior surface complementary to said exterior surface of said segmented nut, the segmented spool split radially into at least two segments;
 e. a restraining wire made of a spring material, coiled and tensioned and wrapped around said exterior surface of said segmented spool for retaining said segmented nut together with said threaded element;
 f. a plunger placed above said segmented nut for retaining and applying pressure to said segmented nut; and
 g. means for inhibiting said restraining wire from releasing said segmented spool;
 h. whereby when said means is in place said restraining wire is coiled and tensioned and compresses said segmented spool which in turn compresses said segmented nut radially inwardly for fastening said threaded element, and when said means is displaced said restraining wire is uncoiled and expands thereby releasing said segmented spool which in turn releases said segmented nut radially outwardly for releasing said threaded element.

16. The invention as defined in claim 15 wherein said bottom end of said housing has a widened flange with means for mounting said housing to an external structure.

17. The invention as defined in claim 16 wherein said means for mounting said housing to said external structure includes at least one screw hole to accommodate at least one mounting screw for mounting said housing to said external structure.

18. The invention as defined in claim 15 further comprising a ramp fitted on said bottom end of said housing and engageable with said segmented nut for assisting said radially inward and outward movements of said at least two segments of said segmented nut.

19. The invention as defined in claim 15 wherein said anti-rotation means includes at least one anti-rotation pin attached to said bottom of said housing and slidably engaged with said segmented nut.

20. The invention as defined in claim 15 further comprising a compression spring placed over said plunger for compressing said segmented nut between said plunger and said ramp.

21. The invention as defined in claim 15 wherein said exterior surface of said segmented nut is cylindrical.

22. The invention as defined in claim 15 wherein said segmented nut splits radially into three segments.

23. The invention as defined in claim 15 wherein said interior surface of said segmented spool is cylindrical.

24. The invention as defined in claim 15 wherein said segmented spool splits radially into three segments.

25. The invention as defined in claim 15 wherein said means for inhibiting said restraining wire is a release pin.

26. The invention as defined in claim 15 further comprising a flexible shaft connected to said release pin at one end and extending through said top end for connection to an actuator at its other end.

27. A separation nut with a restraining wire for fastening and releasing a threaded bolt, the separation nut comprising:
 a. a housing having a top end, a bottom end and a sidewall with a threaded section adjacent to the bottom end, the bottom end having an opening extending into a hollow chamber;
 b. an attachable bottom having a threaded mating surface which mates with said threaded section of said sidewall and forms a base for said housing, the attachable bottom having an opening extending into said hollow chamber of said housing;
 c. a ramp fitted on said attachable bottom around said opening of said bottom and having a ramp surface facing into said hollow chamber;
 d. a segmented nut placed on said ramp surface of said ramp and located inside said chamber adjacent to said attachable bottom, the segmented nut having a threaded bore aligned with said opening of said attachable bottom for receiving said threaded bolt, the segmented nut also having an exterior surface, the segmented nut split radially into at least three segments;
 e. at least one anti-rotation pin attached to said ramp and slidably engaged with said segmented nut for preventing said segmented nut from rotating;
 f. a restraining wire made of a spring material, coiled and tensioned and wrapped around said exterior surface of said segmented nut for retaining said segmented nut together with said threaded bolt;

g. a plunger placed above said segmented nut and having a bottom side with a ramp surface engaged with said segmented nut for retaining and applying pressure to said segmented nut;

h. a spring means placed over said plunger for compressing said segmented nut between said plunger and said ramp; and i. a release pin for inhibiting said restraining wire from releasing said segmented nut, when the release pin is in place said restraining wire is coiled and tensioned and compresses said segmented nut radially inwardly for fastening said threaded bolt, which sets said separation nut in a fastened condition, and when the release pin is displaced said restraining wire is uncoiled and expands thereby releasing said segmented nut radially outwardly for releasing said threaded bolt, which sets said separation nut in a released condition;

j. whereby when said release pin is displaced, said separation nut will shift to said released condition, and when said release pin is in place, said separation nut will maintain said fastened condition.

28. The invention as defined in claim 27 wherein said attachable bottom has a widened flange with means for mounting said housing to an external structure.

29. The invention as defined in claim 28 wherein said means for mounting said housing to said external structure includes at least one screw hole to accommodate at least one mounting screw for mounting said housing to said external structure.

30. The invention as defined in claim 27 wherein said at least one anti-rotation pin is inserted through a hole on said ramp and a stop dent hole on said attachable bottom.

31. The invention as defined in claim 27 wherein said plunger is a spring biased.

32. The invention as defined in claim 27 wherein said spring means is a compression spring.

33. The invention as defined in claim 27 further comprising a flexible shaft extending through said top end of said housing for connection to an actuator.

34. The invention as defined in claim 33 wherein said release pin is connected to said flexible shaft.

35. A separation nut for fastening and releasing a structural element, comprising:

a. a housing having an opening extending into a hollow chamber;

b. a segmented nut located inside said chamber, the segmented nut having a bore aligned with said opening for receiving said structural element, the segmented nut also having an exterior surface, the segmented nut split radially into at least two segments;

c. means for preventing said segmented nut from rotating;

d. a restraining wire made of a spring material, coiled and tensioned and wrapped around said exterior surface of said segmented nut for retaining said segmented nut together with said structural element;

e. a plunger placed above said segmented nut for retaining and applying pressure to said segmented nut; and f. means for inhibiting said restraining wire from releasing said segmented nut;

g. whereby when said inhibiting means is displaced said restraining wire is uncoiled and expands thereby releasing said segmented nut radially outwardly for releasing said structural element, and when said means is in place said restraining wire is coiled and tensioned and compresses said segmented nut radially inwardly for fastening said structural element.

36. The invention as defined in claim 35 further comprising means for mounting said housing to an external structure.

37. The invention as defined in claim 35 further comprising a ramp fitted on said opening of said housing and engageable with said segmented nut for assisting said radially outward movement of said at least two segments of said segmented nut.

38. The invention as defined in claim 35 wherein said anti-rotation means includes at least one anti-rotation pin attached to said housing and slidably engaged with said segmented nut.

39. The invention as defined in claim 35 further comprising a compression spring placed over said plunger for compressing said segmented nut.

40. The invention as defined in claim 35 wherein said means for inhibiting said restraining wire from releasing said segmented nut is a release pin.

41. The invention as defined in claim 35 wherein said means for inhibiting said restraining wire from releasing said segmented nut is electrically actuated.

42. The invention as defined in claim 35 wherein said means for inhibiting said restraining wire from releasing said segmented nut is manually activated.

* * * * *